United States Patent [19]

Golemo, Jr. et al.

[11] 4,366,210

[45] Dec. 28, 1982

[54] CORROSION RESISTANT THERMOSTAT METAL COMPOSITIONS

[75] Inventors: Stanley M. Golemo, Jr., West Lawn; Anthony J. Izbicki, Reading, both of Pa.

[73] Assignee: Hood and Co., Inc., Hamburg, Pa.

[21] Appl. No.: 207,011

[22] Filed: Nov. 14, 1980

[51] Int. Cl.³ .................... B32B 15/01; B32B 15/18
[52] U.S. Cl. .................. 428/617; 428/682; 428/685; 428/925
[58] Field of Search ............... 428/616–619, 428/678–685, 925

[56] References Cited

U.S. PATENT DOCUMENTS 1,769,622   7/1930   Chace ............................... 428/618
1,993,020   3/1935   Scott ................................ 428/619

Primary Examiner—Michael L. Lewis

[57] ABSTRACT

Thermostat metals combining properties of relatively high flexivity and good corrosion resistance are prepared by metalurgically bonding a corrosion resistant high expansive alloy (1) to a less corrosion resistant low expansive alloy (2) and capping the low expansive alloy (2) with a corrosion resistant, moderately low expansive alloy (3) of similar hardness to that of the low expansive alloy (2).

The preferred high expansive alloy (1) is comprised of about 18 wt. % Ni; 11 wt. % Cr; and balance Fe.

The preferred low expansive alloy (2) is Invar (36 wt. % Ni; balance Fe).

The preferred corrosion resistant low expansive alloy (3) is comprised of about 20 wt. % Ni; 26 wt. % Co; 7 wt. % Cr; balance Fe.

The preferred volumetric ratios of the metals is about 50% of the high expansive alloy (1), 30 to 40% of the low expansive metal (2) and 10 to 20% of the corrosion resistant low expansive alloy.

5 Claims, No Drawings

CORROSION RESISTANT THERMOSTAT METAL COMPOSITIONS

BACKGROUND OF THE INVENTION

1. Field of the Invention

This invention relates to a composite thermostat metal (bimetal) and more particularly to a composite thermostat metal that combines qualities of high flexivity and corrosion resistance.

2. Description of the Prior Art

Composite thermostat metals are made of metallurgically bonded layers of metals having comparatively high and low coefficients of thermal expansion. When the temperature of thermostat metal is changed, the differences in the thermal expansion of the several layer materials results in a stress in the bimetal which is relieved by flexing. This flexing or mechanical movement induced by a temperature change can be made use of directly by configuring the bimetal to act as a switch or valve or indirectly by positioning the bimetal to act upon an auxiliary device. The intrinsic ability of an alloy combination to deflect in response to a temperature change is defined as the "flexivity" of the thermostat metal and the amount of flexivity of a given thermostat metal is substantially a direct function of the differences in the coefficients of thermal expansion of the several alloys in the composite thermostat metal. To achieve high flexivities, metal alloys are selected to have relatively large differences in their coefficient of thermal expansion. Other properties such as thermal response function and mechanical stiffness over desired operating temperature ranges, susceptability to metallurgical bonding processes, and resistance to corrosive environments are also of importance.

The terms "thermostat metal" and "flexivity" are more fully defined in ASTM B388 (75) paragraph 3.1 and ASTM B106 (78) respectively.

This invention is concerned with thermostat metals having relatively high levels of flexivity that can be used in corrosive environments. In many common applications for thermostat metals the corrosion resistance of conventional thermostat metals is quite sufficient. There are other applications in which the thermostat metals is exposed to hostile environments which requires care in the selection of the component alloys. An example of the latter is a damper adapted to be permanently installed in the flue of a combustion heating device such as a fireplace or furnace. In this application (see for example U.S. Pat. No. 3,510,059) the thermostat metal is configured to function as a damper which, when cool lays flat across the flue and restricts the flow of gases but, when heated by combustion gases, flexes (curls up) to open the flue. In this application the thermostat metal must be able to resist for many years the corrosive effects of volatile combustion products, including water vapor and acid forming gases, at temperature as high as 400° C. Another demanding application utilizes a valve fashioned from a thermostat metal to control the flow of fluids through a conduit. One interesting application made of a device of this sort is to proportion the flow of hot and cold water so as to deliver water, as to a shower head, at a constant temperature.

The prior art recognizes that higher degrees of corrosion resistance can be obtained if the thermostat metal is made from components that are resistant to corrosive attack. For example, a number of stainless steel alloys are available which have high coefficients of thermal expansion. These are suitable for use as high expansive side (HES) of a thermostat metal and include AISI alloys such as types 302, 309, 316, and 385. Examples of other corrosion resistant alloys which are suitable HES materials include those comprised of 18% nickel, 11% chrome, balance iron, and 25% nickel 8% chrome balance iron. All of the above alloys have coefficients of thermal expansion roughly in a range of from about 9 to about $11 \times 10^{-6}/°$ F.

Unfortunately, the selection of a corrosion resistant alloy having a low coefficient of thermal expansion suitable for use on the low expansive side (LES) is much more limited. For example AISI alloy type 430, an alloy which has sometimes been used as an LES has a coefficient of thermal expansion of $5.8 \times 10^{-6}/°$F. This compares rather unfavorably to Invar, by far the most commonly used and best (except for its poor resistance to corrosion) alloy for the LES which has a coefficient of thermal expansion of only $1.1 \times 10^{-6}/°$ F. The fivefold difference in the coefficient of thermal expansion between AISI 430 and Invar greatly reduces the flexivity and utility of a thermostat metal when AISI 430 is used as the LES.

Corrosion resitant thermostat metals are also made by capping both sides of a high flexivity metal with corrosion resistant alloys. The difficulty encountered here, however, is that, if the cap layers are to be effective, they must be of significant thickness which necessarily will reduce the overall flexivity of the composite. It should be understood that thermostat metals are commonly reduced to the desired product thickness by cold rolling and 20% to 50% cold work is typical to obtain a useful product thickness in a range of 0.005 inches to 0.050 inches. Unless the cap metal is of a similar hardness as the alloy to which it is bonded, there is a tendency for fissures to develop in the cap layer during cold rolling which will expose portions of the surface of the underlying alloy. This development of fissures is particularly pronounced when AISI 430 is used to cap Invar since AISI 430 is much harder than Invar in all states of temper. The problem can be overcome by using a thick cap layer, but then a substantial reduction in the flexivity of the thermostat metal must be accepted.

Another method of providing increased corrosion resistance is to make a thermostat metal comprised of a high flexivity stainless steel HES, a conventional Invar LES and to cap only the LES with a corrosion resistant alloy. This is subject to much of the same objections as mentioned immediately above in that the difference in hardness of a typical stainless alloy such as AISI 430 makes it difficult to cold roll it in thin layers over Invar without developing fissures. The thickness required to avoid fissures, greatly reduces the flexivity of the thermostat metal.

SUMMARY OF THE INVENTION

Accordingly, it is an object of this invention to provide thermostat metals with improved corrosive resistance and relatively high flexivity.

A further object of this invention is to provide thermostat metals having relatively good properties of flexivity and chemical resistance that may be prepared by conventional metallurgical bonding processes.

A further object of this invention is to provide thermostat metals having relatively high flexivity that are suited to prolonged useage in hostile environments.

Briefly, these and other objects of this invention are achieved by metallurgically bonding (1) a corrosion resistant high expansivity alloy to a (2) low expansivity alloy and capping the low expansivity alloy with a (3) corrosion resistant alloy that has a hardness similar to that of the low expansivity alloy.

In accordance with the teachings of this invention, the preferred high expansive alloy is selected from those types of corrosion resistant alloys listed above. These alloys have high coefficients of thermal expansion generally lying in the range of from about 9 to $11 \times 10^{-6}/°$ F. Although all of these corrosion resistant alloys are suitable for use in the practice of this invention, one preferred alloy is 18% nickel, 11% chrome and balance iron. Several reasons that make this alloy a preferred HES are that the alloy is commercially manufactured to closely held expansion alloy tolerances and that the alloy has a high intrinsic corrosion resistance.

The LES alloy of this invention is selected for its low coefficient of thermal expansion without regard to its corrosion resistance. Invar alloy, which is 36% nickel and balance iron, is preferred because of its low coefficient of thermal expansion.

The selection of the cap alloy is the key to the present invention and it must meet the following criteria:
(a) a high degree of corrosion resistance;
(b) a reasonably low expansivity, here defined as not exceeding three times the expansivity of the LES alloy; and
(c) a hardness closely approximating (i.e. within 15%) that of the LES alloy over the range of cold work performed in metallurgical roll bonding processes to maintain the integrity of the capped layer.

A preferred cap alloy of this invention especially suited to cap an Invar alloy LES is comprised of 20% nickel, 26% cobalt, 7% chromium and balance iron. This alloy has good corrosion resistance and a coefficient of thermal expansivity of $2.5 \times 10^{-6}/°$ F. which is only slightly twice that of Invar. The alloy can be annealed prior to bonding to a Vickers hardness of about 150 (ASTM E92) which compares quite favorably to the Vickers hardness of annealed Invar which is about 140. Over the entire range of cold work from 0 to 50%, the Vickers hardness of the Ni/Co/Cr/Fe alloy does not vary more than 10% from that of the Invar alloy and, in fact, at 25% cold work is essentially identical to that of the Invar. Due to this close correlation of the Vickers hardness values, the alloy can be used to cap the Invar in comparatively thin layers while maintaining cap layer integrity at composite thicknesses of less than 0.008 inches.

In the preferred practice of this invention, 50% by volume of the composite thermostat metal is the HES alloy and the remaining is the composite of the LES and the capping alloy. While as little as about 5% of the preferred Ni/Co/Cr/Fe, capping layer will provide corrosion resistance, excellent corrosion resistance is obtained in the range of 10 to 20 volume % of the thermostat metal without seriously detracting from the flexivity of the metal. It has been found that 15% of the capped metal provides about the best balance in properties of flexivity and corrosion resistance. The following examples are illustrative.

EXAMPLES

EXAMPLE I

A conventional thermostat metal is prepared from:
(a) HES—50% by volume 18% Ni; 11% Cr; balance Fe alloy.
(b) LES—50% by volume Invar alloy.

The flexivity of this thermostat metal was measured at $138 \times 10^{-7}/°$ F. (100° F., 300° F.) which is quite good, however, its corrosion rate in flowing tap water (75° F., 140° F.) was 70 micrometers per year which is unacceptable in many hostile environments.

EXAMPLE II

A thermostat metal similar to that of Example I was prepared except that AISI 430 stainless replaced the Invar metal for the LES. While the corrosion rate was greatly reduced to only 0.7 micrometers per year, the flexivity fell to an unacceptable level of only $61 \times 10^{-7}/°$ F.

EXAMPLE III

A thermostat metal was prepared similar to that of Example I except the Invar alloy LES was capped with AISI 430 stainless. The thermostat metal composition was:
(a) HES—46% by volume 18% Ni; 11% Cr; balance Fe alloy.
(b) LES—46% by volume Invar alloy.
(c) LES Cap—8% by volume AISI 430.

The thermostat metal was rolled by conventional technique to a thickness of 0.050 inches which caused the cap layer to become discontinuous opening fissure to the surface of the Invar LES. The flexivity was measured at $107 \times 10^{-7}/°$ F. prior to fracture of the cap layer.

EXAMPLE IV

A thermostat metal was prepared in accordance with the preferred practice of this invention. The thermostat metal was comprised of:
(a) HES—50% by volume 18% Ni; 11% Cr; balance Fe alloy.
(b) LES—35% by volume Invar alloy.
(c) LES Cap—15% by volume 20% Ni; 26% Co; 7% Cr; balance Fe alloy.

The above thermostat metal was successfully cold rolled to a thickness of 0.008 inches without loss of integrity of the cap layer. The flexivity was measured at $122 \times 10^{-7}/°$ F. and the corrosion rate in flowing tap water (75° F., 140° F.) was measured at 0.5 micrometers per year. It can be seen that in the practice of this invention, the corrosion of the standard thermostat metal of Example I can be increased about 140 times with only about a 12% loss in flexivity thus making it suitable for use in hostile environments.

We claim:
1. A thermostat metal comprising metallurgical bonded layers of
(a) a corrosion resistant high expansivity alloy,
(b) a corrosion susceptable low expansive alloy comprised of 36% Ni, balance Fe, and
(c) a cap over the low expansivity alloy consisting of a corrosion resistant alloy having an expansivity less than three times that of the low expansivity alloy and a hardness within 15% of that of the low expansivity alloy at all states of temper.

2. A thermostat metal according to claim 1 wherein the cap is an alloy comprised of 20% Ni, 26% Co, 7% Cr, balance Fe.

3. A thermostat metal according to claim 2 wherein the high expansivity alloy is 18% Ni, 11% Cr, balance Fe.

4. A thermostat metal according to claim 2 wherein the volume percents of the layers are about 50% high expansivity alloy, and 5% to 20% cap alloy.

5. A thermostat metal according to claim 4 wherein the volume percent of the low expansivity alloy is 30% to 40% and the volume percent of the cap is 10% to 20%.

* * * * *